United States Patent
Henderson, IV et al.

(10) Patent No.: US 9,163,548 B2
(45) Date of Patent: Oct. 20, 2015

(54) EXHAUST SYSTEM INCLUDING AN EXHAUST MANIFOLD HAVING AN INTEGRATED MIXER PLATE

(71) Applicant: Ford Global Technologies, LLC, Dearborn, MI (US)

(72) Inventors: Cornelius Langston Henderson, IV, Southfield, MI (US); Ray Host, Mount Clemens, MI (US); Michael Collareno, Northville, MI (US); George I. Tapos, Birmingham, MI (US); Christopher Oberski, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/044,384

(22) Filed: Oct. 2, 2013

(65) Prior Publication Data

US 2015/0089923 A1    Apr. 2, 2015

(51) Int. Cl.
| | |
|---|---|
| *F01N 3/00* | (2006.01) |
| *F01N 13/10* | (2010.01) |
| *F01N 3/28* | (2006.01) |
| *F01N 3/10* | (2006.01) |
| *F01N 13/00* | (2010.01) |

(52) U.S. Cl.
CPC ............... *F01N 13/10* (2013.01); *F01N 3/101* (2013.01); *F01N 3/28* (2013.01); *F01N 13/008* (2013.01); *F01N 2240/20* (2013.01)

(58) Field of Classification Search
CPC ........... F01N 3/10; F01N 3/00; F01N 3/2066; F01N 3/2892; B01F 5/0689; B01F 3/04049
USPC .................................................... 60/272–324
See application file for complete search history.

(56) References Cited

U.S. PATENT DOCUMENTS

| | | | |
|---|---|---|---|
| 3,420,052 A * | 1/1969 | Miller | 60/320 |
| 3,615,255 A | 10/1971 | Patterson et al. | |
| 3,749,130 A | 7/1973 | Howitt et al. | |
| 4,065,918 A | 1/1978 | Rifkin | |
| 5,185,998 A | 2/1993 | Brew | |
| 5,209,062 A * | 5/1993 | Vollenweider | 60/280 |
| 5,390,651 A * | 2/1995 | Nussbaum et al. | 123/694 |
| 7,997,071 B2 | 8/2011 | Blaisdell | |
| 8,371,115 B2 | 2/2013 | Sloss et al. | |
| 2007/0245718 A1* | 10/2007 | Cheng et al. | 60/286 |
| 2009/0188246 A1 | 7/2009 | Galligan | |
| 2009/0266064 A1* | 10/2009 | Zheng et al. | 60/317 |
| 2010/0170232 A1 | 7/2010 | Whitten et al. | |

(Continued)

FOREIGN PATENT DOCUMENTS

EP            1734235 A1      12/2006

*Primary Examiner* — Thomas Denion
*Assistant Examiner* — Kelsey Stanek
(74) *Attorney, Agent, or Firm* — Julia Voutyras; Alleman Hall McCoy Russell & Tuttle LLP

(57) ABSTRACT

An exhaust system for an engine is provided herein. The exhaust system includes an emission control device and an exhaust manifold having a plurality of runners merging at a confluence section positioned upstream of the emission control device. The exhaust system further includes a mixer plate positioned in the confluence section, the mixer plate including a central opening and a plurality of louvered vents positioned axially around the central opening, the louvered vents having angled openings facing a common rotational direction.

19 Claims, 5 Drawing Sheets

(56) References Cited

U.S. PATENT DOCUMENTS

| | | |
|---|---|---|
| 2011/0271662 A1 | 11/2011 | Winsor |
| 2012/0060473 A1* | 3/2012 | Turpin et al. .................... 60/274 |
| 2013/0269325 A1* | 10/2013 | Hadden et al. ................. 60/297 |

* cited by examiner

EXHAUST SYSTEM INCLUDING AN EXHAUST MANIFOLD HAVING AN INTEGRATED MIXER PLATE

FIELD

The present disclosure relates to an exhaust system having a mixer plate positioned in an exhaust manifold upstream of an emission control device.

BACKGROUND AND SUMMARY

Exhaust systems are used in combustion engines to manage exhaust gas produced through combustion operation in engine cylinders. The exhaust systems may include exhaust manifolds, emission control devices, mufflers, etc. However, vehicle designs may impose packaging constraints on the exhaust system to achieve a desired vehicle profile or compactness. However, these packaging constraints may be at odds with various functional characteristics of the exhaust system such as emission control device operation, turbine operation, back pressure generation, etc. For example, shortening an exhaust manifold may lead to increased back pressure generation and/or create uneven flow distribution for downstream components such as a catalyst. Therefore, tradeoffs may be made between vehicle compactness and the functional characteristics of the exhaust system.

U.S. Pat. No. 7,997,071 discloses an exhaust flow distribution device positioned in a muffler upstream of an integrated exhaust aftertreatment device, such as a catalyst or diesel particulate filter. The flow distribution device disrupts the exhaust gas flow travelling through the muffler.

The Inventors have recognized several drawbacks with the exhaust flow distribution device discloses in U.S. Pat. No. 7,997,071. For example, the flow distribution device may not uniformly distribute exhaust gas. For instance, wakes may be generated behind the deflectors in the flow distribution device, thereby decreasing velocity distribution of the exhaust gas directly behind the flow distribution device. Furthermore, this device is suited to exhaust flows that are centrally discharged into a symmetric catalyst inlet cone, and not a compact exhaust manifold.

The inventors herein have recognized the above issues and developed an exhaust system for an engine. The exhaust system includes an emission control device and an exhaust manifold having a plurality of runners merging at a confluence section positioned upstream of the emission control device. The exhaust system further includes a mixer plate positioned in the confluence section, the mixer plate including a central opening and a plurality of louvered vents positioned axially around the central opening, the louvered vents having angled openings facing a common rotational direction.

The mixer plate may enable the exhaust gas flow provided to the downstream emission control device to be more evenly distributed. As a result, emission control device operation may be improved. Specifically, in one example, the tangential exhaust gas flow generated via the exhaust runners works in conjunction with the angled louvered vents to decrease velocity variability in the exhaust gas. As a result, the gas flow from the individual runners of the compact exhaust manifold are less likely to use separate zones of the catalyst brick, thereby improving the conversion efficiency of the emission control device. This is especially true when the air-fuel ratio from each cylinder is not stichiometric. Further, it will be appreciated that the mixer plate may not significantly increase backpressure in the exhaust manifold, which may degrade high load performance (e.g., full load performance), due to the central opening in the mixer plate. As a result, a compact exhaust manifold may be used in the exhaust system, if desired, without significantly increasing backpressure or decreasing the exhaust gas conversion efficiency in the emission control device. Thus, traditional trade-offs between desired characteristics in the exhaust system discussed above may be circumvented.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIGS. 2-9 are drawn to scale, although other relative dimensions may be used, if desired.

DETAILED DESCRIPTION

An exhaust system is described herein. The exhaust system includes an exhaust manifold having a plurality of exhaust runners merging at a confluence section and an emission control device directly coupled to the confluence section. The exhaust system further includes a mixer plate spanning the confluence section, the mixer plate includes a central opening and a plurality of louver vents positioned axially around the central opening. The louvered vents are positioned such that they have angled openings facing a common rotational direction. The tangential airflow generated in the exhaust runners and the louvered vents work in conjunction to decrease velocity variability in the exhaust gas flow. As a result, exhaust gas may be evenly distributed to the downstream emission control device, thereby improving operation of the emission control device. Thus, the mixer plate reduces the zoning of flow from individual cylinders onto the downstream catalyst brick, and allows the flow from different cylinders to overlap. In this way, conversion efficiency of the emission control device is increased when there is an air fuel ratio imbalance in the engine and the engine's environmental impact is reduced. Additionally, the mixer plate does not significantly increase back pressure in the exhaust manifold due to the position of the central opening, thereby reducing the likelihood of high load performance (e.g., full load performance) degradation caused by backpressure in the exhaust system. Additionally in one example, an exhaust gas sensor coupled to the exhaust manifold may extend through the central opening. As a result, the strength of the signal from the sensor may be improved due to the large amount of exhaust gas flowing through the central opening.

Figure 1:
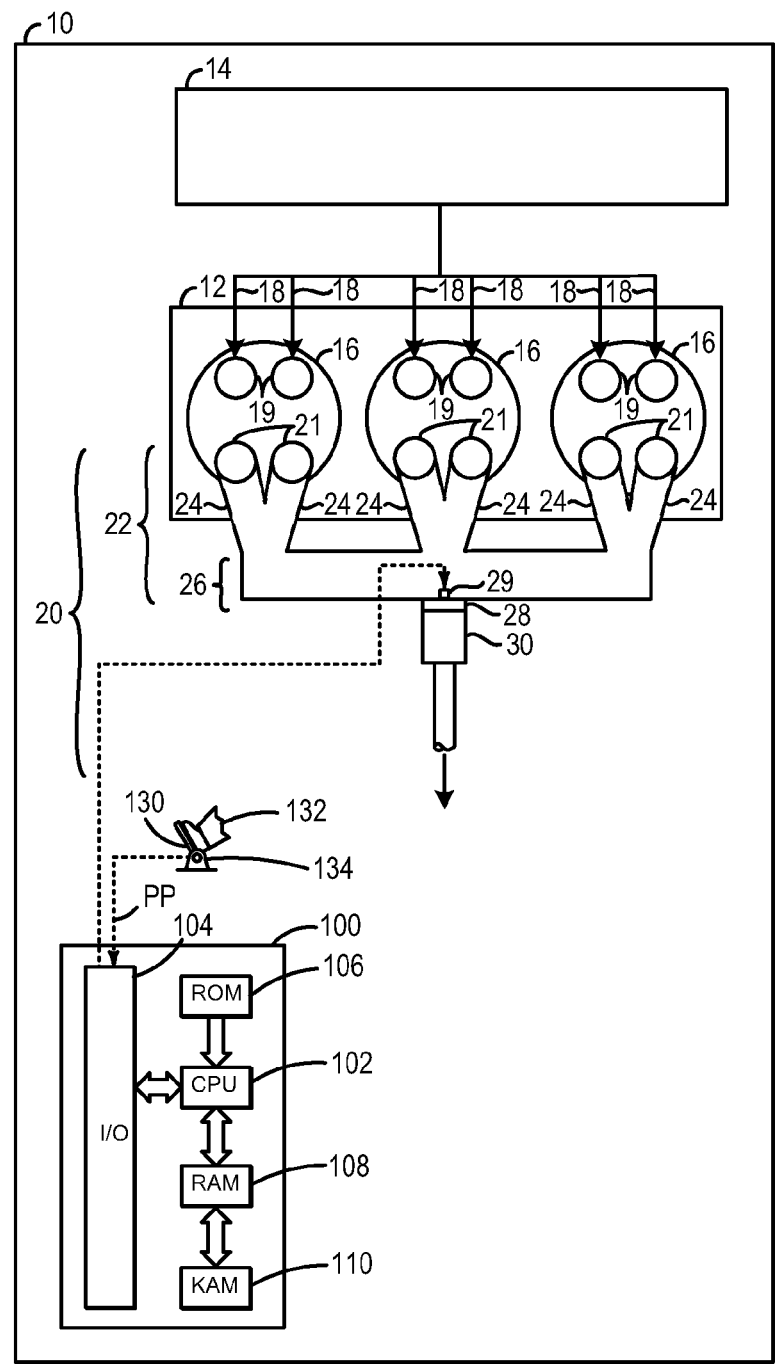
FIG. 1 shows a schematic depiction of a vehicle having an engine and an exhaust system.

FIG. 1 shows a schematic depiction of a vehicle 10 including an engine 12. The engine 12 is configured to implement combustion operation. For example, a four stroke combustion cycle may be implemented including an intake stroke, a compression stroke, a power stroke, and an exhaust stroke. However, other types of combustion cycles may be utilized in other examples. In this way, motive power may be generated in the vehicle 10. It will be appreciated that the engine may be coupled to a transmission for transferring rotation power generated in the engine to wheels in the vehicle.

The vehicle 10 includes an intake system 14 providing intake air to a plurality of cylinders 16 in the engine 12. The fluidic communication between the intake system 14 and the cylinders 16 is denoted via arrows 18. The intake system 14 may include a variety of components such as intake conduits, filters, a throttle, an intake manifold, etc. Three cylinders are depicted in an inline configuration where the cylinders are positioned in a straight line in FIG. 1. Although three cylinders are depicted it will be appreciated that engines having an alternate number of cylinders has been contemplated. For instance, the engine may include two banks of cylinders. In one example, the three depicted cylinders may be included in a first bank of cylinders. Additionally, the cylinders may have different arrangements. For instance, the cylinder may be arranged a horizontally opposed configuration, a V-configuration, etc. The cylinders 16 may be mechanically coupled to a crankshaft (not shown).

Each of the cylinders 16 includes two intake ports 19 and two exhaust ports 21, in the depicted example. The intake ports and exhaust ports may include valves configured to permit and inhibit intake and exhaust flow, respectively, into the cylinders 16. It will be appreciated that engines having an alternate number of intake and/or exhaust ports have been contemplated. The intake ports 19 are in fluidic communication with the intake system 14 and the exhaust ports 21 are in fluidic communication with an exhaust system 20.

The vehicle 10 includes the exhaust system 20. The exhaust system 20 is configured to receive exhaust gas from the cylinders 16 and specifically the exhaust ports 21. The exhaust system 20 includes an exhaust manifold 22 in fluidic communication with each of the cylinders 16. The exhaust manifold 22 includes a plurality of exhaust runners 24. The exhaust runners 24 merge to form a confluence section 26 in the exhaust manifold 22.

A mixer plate 28 is positioned in the confluence section 26. Specifically, the mixer plate 28 may span the confluence section 26. The mixer plate 28 is configured to increase the flow distribution of the exhaust gas travelling therethrough to improve operation of a downstream emission control device 30. Thus, the mixer plate 28 is configured to reduce zone flow. The specific structural characteristics of the mixer plate 28 which enable an increase in flow distribution of the exhaust gas are discussed in greater detail herein with regard to FIGS. 2-9.

An exhaust gas sensor 29 is coupled to the exhaust manifold 22 and specifically may extend through a sensor port in the manifold. Additionally, the exhaust gas sensor 29 may extend through the mixer plate 28 and is discussed in greater detail herein. The exhaust gas sensor 29 is in electronic communication with a controller 100. The exhaust gas sensor 29 may be an oxygen sensor, an exhaust gas composition sensor, etc.

The exhaust system further includes an emission control device 30. The emission control device 30 may be integrated into the exhaust manifold 22 forming a single continuous component, in one example. The emission control device 30 is positioned directly downstream of the mixer plate 28. The emission control device 30 may be a 3-way catalyst, in one example. Additionally, it will be appreciated that the exhaust system components are schematically depicted in FIG. 1 and that the components have additional structural complexity that is shown in FIGS. 2-9 and discussed in greater detail herein.

The vehicle 10 further includes a fuel delivery system (not shown) configured to provide fuel to the cylinders 16. The fuel delivery system may be configured to provide port and/or direction fuel injection. The fuel delivery system may include various components such as fuel pumps, fuel tanks, fuel injectors, etc.

A controller 100 may be included in the vehicle 10. The controller 100 may be configured to receive signals from sensors in the vehicle as well as send command signals to components. Various components in the vehicle 10 may be controlled at least partially by a control system including the controller 100 and by input from a vehicle operator 132 via an input device 130. In this example, input device 130 includes an accelerator pedal and a pedal position sensor 134 for generating a proportional pedal position signal PP. The controller 100 is shown in FIG. 1 as a microcomputer, including processor 102 (e.g., microprocessor unit), input/output ports 104, an electronic storage medium for executable programs and calibration values shown as read only memory 106 (e.g., read only memory chip) in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. As shown, the controller 100 receives a signal from the exhaust gas sensor 29 coupled to the exhaust manifold 22.

Figure 2:
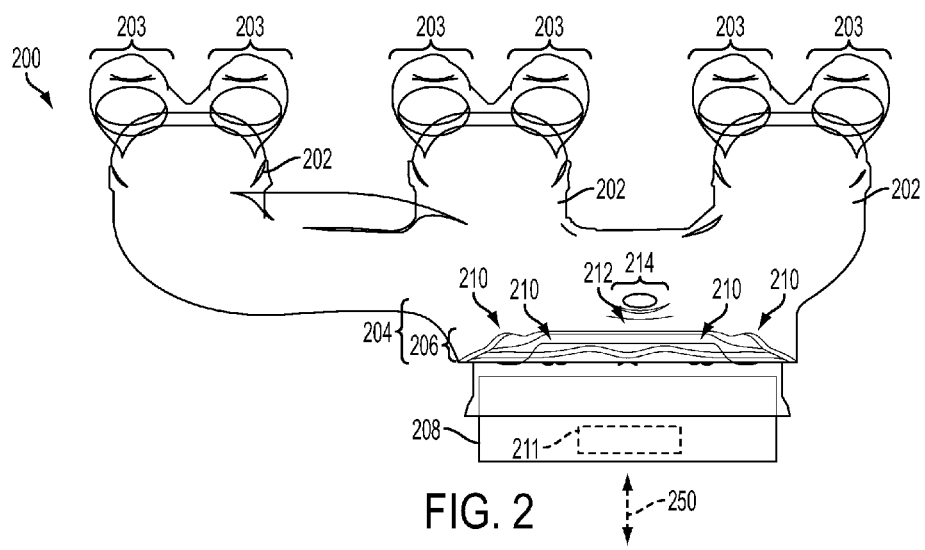
FIG. 2 shows an example exhaust manifold having mixer plate positioned therein and an emission control device.

FIG. 2 shows an example exhaust manifold 200. The exhaust manifold 200 may be a more detail depiction of the exhaust manifold 22 shown in FIG. 1. The exhaust manifold 200 includes exhaust runners 202. The exhaust runners 202 may have a compact design which may generate an oblique gas flow (e.g., a predominantly oblique gas flow). Without the mixer plate the oblique gas flow exiting the runners would result in zoning of the flow which would degrade operation of a downstream catalyst or other emission control device. However, the mixer plate corrects the otherwise poor flow quality of a compact manifold design and decreases oblique gas flow exiting the exhaust manifold.

Each of the exhaust runners 202 are in fluidic communication with a cylinder, such as the cylinders 16 shown in FIG. 1, via manifold inlets 203. Thus, the exhaust manifold 200 shown in FIG. 2 may be the exhaust manifold 22 shown in FIG. 1. Continuing with FIG. 2, the exhaust runners 202 merge to form a confluence section 204 of the exhaust manifold 200. A mixer plate 206 is positioned within the confluence section 204. Specifically, the mixer plate 206 spans (e.g., radially spans) the confluence section 204. The mixer plate 206 shown in FIG. 2 may be a more detailed depiction of the mixer plate 28 shown in FIG. 1. The mixer plate 206 is configured to decrease variance in exhaust gas velocity flowing from the exhaust manifold 200 to an emission control device 208 (e.g., a catalyst). The emission control device 208 includes at least one catalyst brick 211, in one example. It will be appreciated that the confluence section 204 is positioned directly upstream of the emission control device 208. Thus, the outlet of the exhaust manifold is directly coupled to the emission control device, in the depicted example. However, other component arrangements have been contemplated. The mixer plate only affects the quality of the flow in the confluent section directly upstream of the emission control device. Thus, there are not intervening components between the confluence section and the emission control device. In this way, the compactness of the exhaust system may be increased. However, in other examples there may be intervening components between the confluence section and the emission control device. Further in one example, the mixer plate and an exhaust manifold housing of the exhaust manifold 200 comprise different materials.

The mixer plate 206 includes louvered vents 210. The louvered vents 210 shown in FIG. 2 extend in an axial direction. An axis 250 is provided for reference. Specifically, the louvered vents 210 extend in an upstream and downstream direction. Specifically, the louvered vents 210 redirect the tangential exhaust gas flow generated in the exhaust runners 202 to decrease velocity variability in the exhaust gas flowing downstream of the mixer plate 206. The louvered vents 210 are positioned axially around a central opening 212. The central opening 212 may be aligned with the central axis 250. The axis 250 is the central axis of the emission control device 208. The central opening 210, decreases the amount of back pressure generated in the exhaust system. In this way, high load performance (e.g., full load performance) may not be degraded by the mixer plate. An exhaust gas sensor port 214 is also included in the exhaust manifold 200. An exhaust gas sensor may extend through the exhaust gas sensor port 214.

Figure 3:
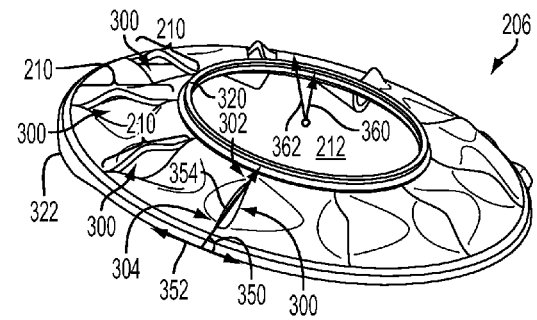
FIGS. 3 and 4 show a detailed view of the mixer plate shown in FIG. 2.
Figure 4:
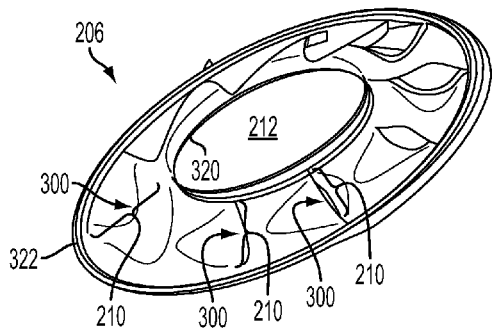

A detailed view of the mixer plate 206 is shown in FIGS. 3 and 4. The central opening 212 and the louvered vents 210 are depicted. As previously discussed the louvered vents 210 extend in an upstream and downstream direction. However, other louvered vent geometries have been contemplated. Each of the louvered vents 210 includes an angle opening 300 facing a common rotational direction.

An angle 350 of one of the openings 300 is illustrated in FIG. 3. The angle 350 is defined by an intersection of a line 352 tangent to the periphery of the mixer plate 206 and a line 354 extending from an inner edge 302 of the louvered vent to an outer edge 304 of the louvered vent. The angle 350 is 90 degrees. However, in other examples the angle may be between 45 to 135 degrees. The angled louver vents enables the exhaust gas flow velocity to be more evenly distributed downstream of the mixer plate 206. A width of the openings 300 in an axial direction may be greater than 3 mm, in one example.

A ratio between a radius 360 of the central opening 212 and an outer radius 362 of the mixer plate 206 may be 0.3 to 0.9. It will be appreciated that when the central opening 212 is sized in this way the amount of back pressure generated via the mixer plate 206 may not be significant.

The louvered vents 210, shown in FIGS. 3 and 4 have a similar geometry, size, and orientation. However, the geometry, size, and/or orientation of the louvered vents 210 may vary. It will be appreciated that the louvers function to redirect peripheral flow through the mixer plate. Additionally, the mixer plate 206 includes an inner peripheral surface 320 to an outer peripheral surface 322. The inner peripheral surface 320 defines the boundary of the central opening 212. Additionally, the axial height of the inner peripheral surface 320 (which may range from 1 to 20 mm), the angled openings 300 may range from 25 to 700 square mm, and the axial location of the mixer plate relative to the front face of the catalyst which may range from 5 mm to 50 mm and also affects the downstream catalyst flow distributions.

The louvered vents do not create openings perpendicular to the central axis of the mixer plate 206. Rather, the louvered vents create openings extending in an axial direction. Therefore, a line parallel to the axis of the mixer plate cannot pass through the louvered vents. In this way, the louvered vents 210 increase swirling of the exhaust gas, thereby increasing exhaust gas flow distribution for each individual runner. The louvered vents redirect the exhaust stream in a way that adds a strong radial component in the region upstream of a catalyst face. Since the swirling gas flow cannot penetrate the axial channels of the catalyst brick without an axial velocity component, the flow has a tendency to swirl above the catalyst entrance face until pressure is redistributed. This equalizes the flow distribution through the channels of the catalyst brick as each runner flows.

Figure 5:
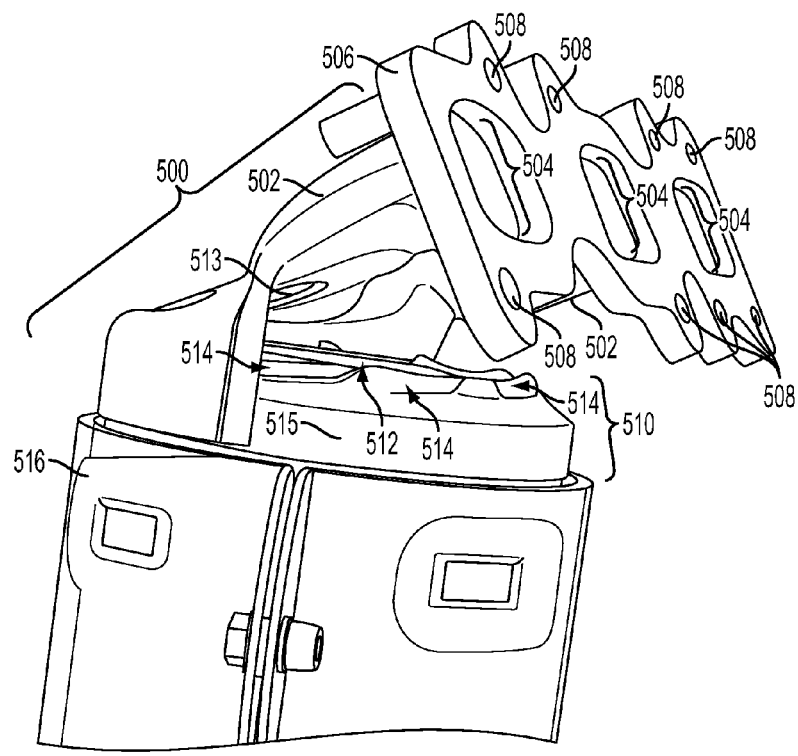
FIG. 5 shows another example exhaust manifold having a mixer plate.

FIG. 5 shows another example exhaust manifold 500. The exhaust manifold 500 may be a more detail depiction of the exhaust manifold 22 shown in FIG. 1. The exhaust manifold 500 includes exhaust runners 502. Each of the exhaust runners 502 includes an inlet 504. The inlets 504 and therefore the exhaust runners 502 are in fluidic communication with cylinders, such as the cylinders 16, shown in FIG. 1. A coupling plate 506 is coupled to the inlets of the exhaust runners 502. The coupling plate 506 includes attachment openings 508 which may be coupled to a cylinder head (not shown). An exhaust valve port 507 is included in the exhaust manifold 500. An exhaust gas valve (not shown) may extend through the port 507. A mixer plate 510 is also depicted in FIG. 5. A portion of the exhaust manifold 500 is removed to enable viewing of the mixer plate 510.

Figure 6:
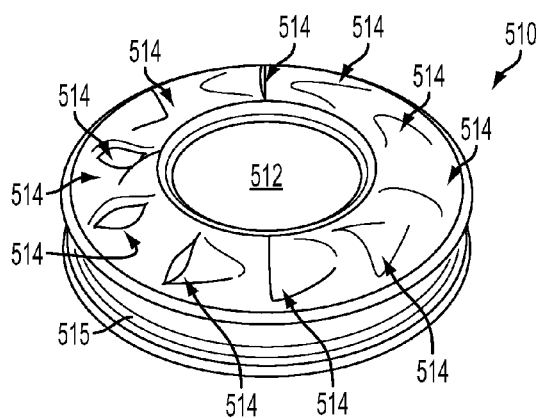
FIG. 6 shows a detailed view of the mixer plate shown in FIG. 4.

The mixer plate 510 is configured to decrease variability in the velocity of the exhaust gas flowing therethrough. The mixer plate 510 includes a central opening 512 and a plurality of louvered vents 514 positioned axially around the central opening. The mixer plate 510 includes a peripheral surface 515. The peripheral surface 515 is parallel to a central axis of the mixer plate 510 and an emission control device 516. The peripheral surface 515 of the mixer plate 510. The emission control device 516 is shown directly coupled to the exhaust manifold 500. The emission control device 516 may be a 3-way catalyst, in one example. It will be appreciated that the components shown in FIG. 5 may be included in the exhaust system shown in FIG. 1. A detailed view of the mixer plate 510 is shown in FIG. 6. The central opening 512 and the louvered vents 514 are depicted in FIG. 6. The louvered vents 514 are positioned axially around the central opening 512 and have angle openings 518 facing a common rotational direction.

FIG. 6 shows a detailed view of the mixer plate 510. The louvered vents 514, central opening 512, and peripheral surface 515 of the mixer plate are depicted. Again the mixer plate increases flow distribution in downstream exhaust gas flow, thereby improving operation of the emission control device 516 shown in FIG. 5.

Figure 7:
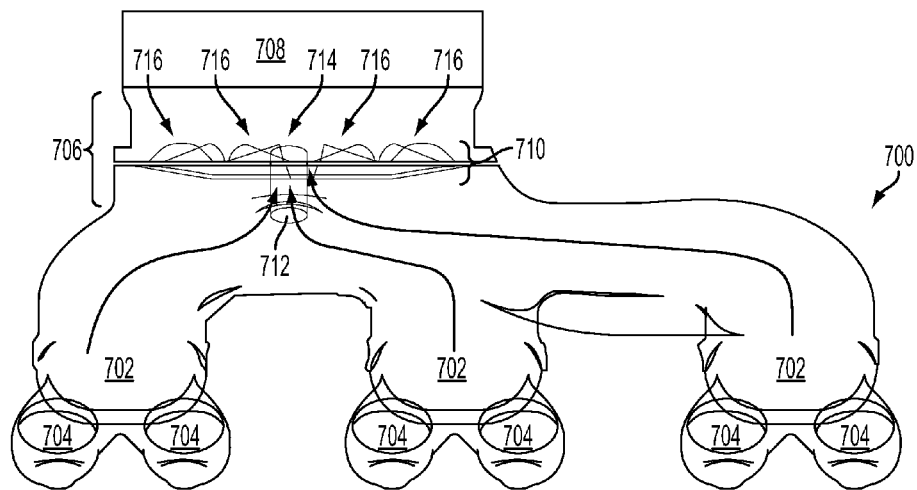
FIGS. 7 and 8 show different views of another example exhaust manifold.

FIG. 7 show an example exhaust manifold 700. The exhaust manifold 700 may be similar to the exhaust manifold 22 shown in FIG. 1. The exhaust manifold 700 includes inlets 702 and exhaust runner 704. The inlets 702 are in fluidic communication with exhaust ports, such as the exhaust ports 21 shown in FIG. 1. The exhaust manifold 700 includes a confluence section 706 where the exhaust runners 704 merge. An emission control device 708 coupled (e.g., directly coupled) to the confluence section 706 is also depicted. The emission control device 708 may be a 3-way catalyst, in one example.

A mixer plate 710 is positioned in the confluence section 706. Specifically, the mixer plate 710 may be coupled to the confluence section. The coupling may be implemented via welding, casting, gluing, etc. It will be appreciated that the mixer plate 710 may be welded or otherwise coupled to the exhaust manifold 700 at a late stage in the manufacturing process. Thus, the mixer plate 710 may be used in a number of different exhaust manifolds, thereby increasing the plate's applicability. Since the plate is very compact and fits internally, it may be used when there is limited available space between the outlets of the cylinder head and the face of the emission control device (e.g., catalyst). In this way, the plate allows the use of a very compact exhaust manifold design without the poor catalyst flow distribution typically associated with a compact design.

An exhaust gas sensor 712 is shown extending through a central opening 714 of the mixer plate 710. The exhaust gas sensor may be an oxygen sensor, a heated exhaust gas oxygen sensor, etc. It will be appreciated that the strength of the exhaust gas sensor signal may be improved when the sensor is positioned in the central opening due to the large amount of exhaust gas flow traveling therethrough. The mixer plate 710 also includes louvered vents 716 positioned around the central opening 714. As discussed above, the louvered vents 716 decrease the velocity variability in the exhaust gas flow downstream of the mixer plate.

Figure 8:
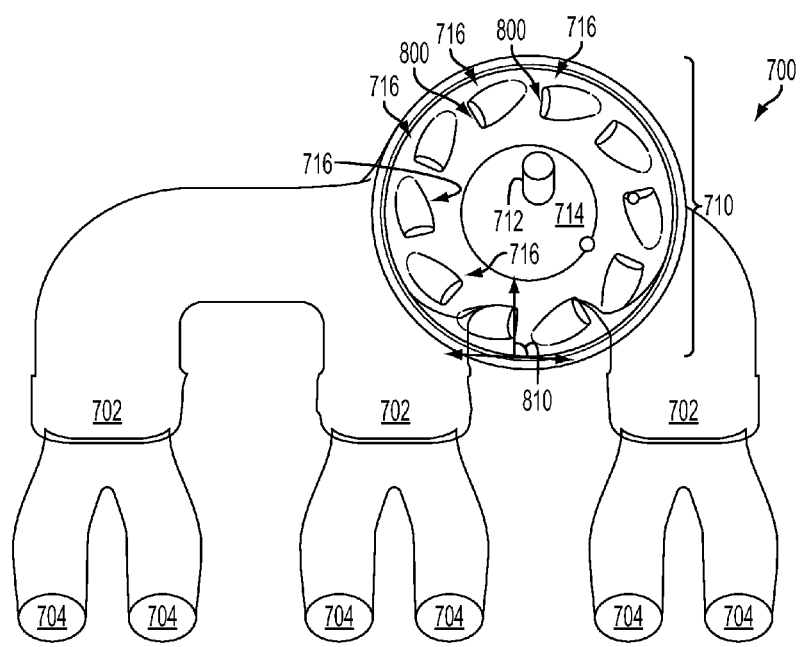

FIG. 8 shows another view of the example exhaust manifold 700 shown in FIG. 7. As shown the mixer plate 710 includes the central opening 714 surrounded by the louvered vents 716. The louvered vents 716 have angled openings 800 facing a common rotational direction. An angle 810 of a line extending across the openings and a line tangent to an outer edge of the mixer plate 710 may be 45 to 135 degrees, in one example. The exhaust runners 702 and the inlets 702 are also shown in FIG. 8. The louvered vents 716 extend in a downstream direction.

Figure 9:
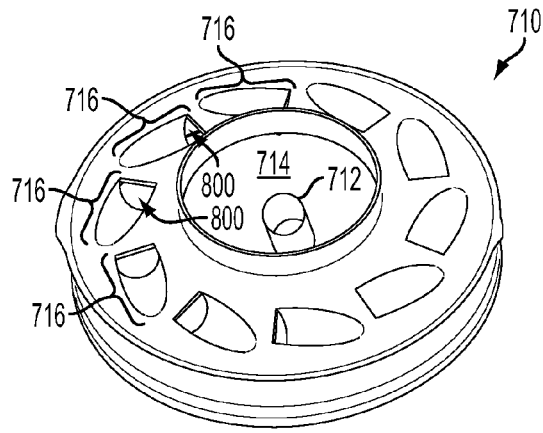
FIG. 9 shows a detailed view of the mixer plate shown in FIGS. 7 and 8.

FIG. 9 shows a detailed view of the mixer plate 710 shown in FIGS. 7 and 8. The louvered vents 716, angled openings 800, central opening 714, and sensor 712 are depicted. The louvered vents 800 are curved in a direction extending from an inner side of the vent to an outer side of the vent. In one example, the louvered vents may be curved in an axial direction. However, other louvered vent geometries have been contemplated.

Figure 10:
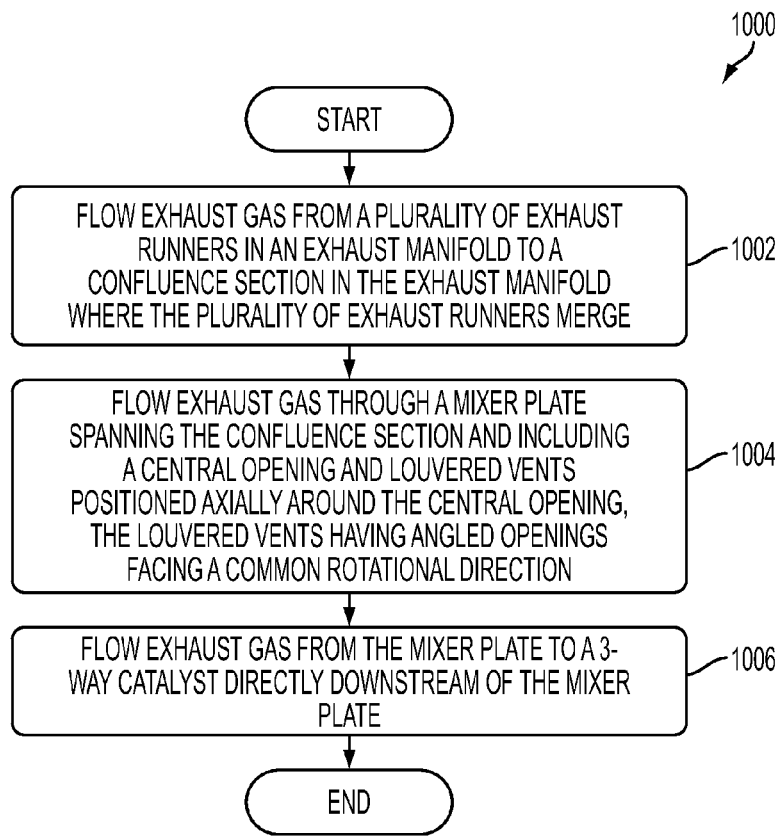
FIG. 10 shows a method for operation of an exhaust system.

FIG. 10 shows a method 1000 for operation of an exhaust system. The method 1000 may be implemented via the exhaust systems discussed above with regard to FIGS. 1-9 or may be implemented via other suitable exhaust systems.

The method includes at 1002 flowing exhaust gas from a plurality of exhaust runners in an exhaust manifold to a confluence section in the exhaust manifold where the plurality of exhaust runners merge.

Next at 1004 the method includes flowing exhaust gas through a mixer plate spanning the confluence section and including a central opening and louvered vents positioned axially around the central opening, the louvered vents having angled openings facing a common rotational direction. At 1006 the method includes flowing exhaust gas from the mixer plate to a 3-way catalyst directly downstream of the mixer plate. In one example, an exhaust gas sensor extends through the central openings. In another example, the louvered vents extend in an axial direction.

In one example, an exhaust system for an engine include an emission control device having a can, mat, and monolithic catalyst brick positioned therein. An exhaust manifold having a plurality of runners merging at a confluence section may be positioned directly upstream of the emission control device, with the exhaust manifold mounted directly to the can of the emission control device, with only a mixer plate therebetween. The mixer plate may be positioned in the confluence section. The mixer plate may include only a single central opening, but a plurality of symmetric radial louvered vents positioned around the central opening, without any other openings in the plate. The louvered vents may each include an angled opening, with each facing a common rotational direction, the central opening not imparting any rotational flow via any angled vents or louvers. The louvered vents may each extend upstream and/or downstream of the plane of the mixing plate in which the central opening is contained. The mixing plate may be positioned downstream of all exhaust runner ports that lead from a cylinder in the group of cylinders coupled to the manifold. In one example, one mixing plate may be provided on each bank of a V-engine. The front fact of the catalyst brick may directly face a downstream side of the mixing plate, without any other obstructions therebetween.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system, comprising:
    a 3-way catalyst;
    an exhaust manifold having an outlet directly coupled to the 3-way catalyst and a plurality of runners merging at a confluence section positioned upstream of the 3-way catalyst; and
    a mixer plate positioned in the confluence section, the mixer plate including a central opening and a plurality of louvered vents positioned axially around the central opening, the louvered vents having angled openings facing a common rotational direction.

2. The exhaust system of claim 1, where the louvered vents extend in an upstream direction.

3. The exhaust system of claim 1, where the louvered vents extend in a downstream direction.

4. The exhaust system of claim 1, where the louvered vents extend in a downstream direction and an upstream direction.

5. The exhaust system of claim 1, where openings defined by the louvers do not extend in a radial direction.

6. The exhaust system of claim 1, further comprising an exhaust gas sensor extending into the central opening.

7. The exhaust system of claim 1, where an inlet of the central opening is positioned upstream of the louvered vents.

8. The exhaust system of claim 1, where the louvered vents are curved in an axial direction.

9. The exhaust system of claim 1, where a width of the openings in an axial direction is greater than 3 mm.

10. The exhaust system of claim 1, where a ratio between a diameter of the central opening and an outer diameter of the mixer plate is 0.3 to 0.9.

11. The exhaust system of claim 1, where the louvered vents form an angle with a tangent line to an outer surface of the mixer plate which is 45 to 135 degrees.

12. The exhaust system of claim 1, where the louvered vents are not equivalent in at least one of size and geometry.

13. The exhaust system of claim 1, wherein the mixing plate includes an outer peripheral surface positioned within and directly coupled to an outlet of the exhaust manifold.

14. A method for operating an exhaust system coupled to an engine, comprising:
   flowing exhaust gas from a plurality of exhaust runners in an exhaust manifold to a confluence section in the exhaust manifold where the plurality of exhaust runners merge;
   flowing exhaust gas through a mixer plate spanning the confluence section and including a central opening and louvered vents positioned axially around the central opening, the louvered vents having angled openings facing a common rotational direction, an exhaust gas sensor extending through the central opening; and
   flowing exhaust gas from the mixer plate to a 3-way catalyst directly downstream of the mixer plate.

15. The method of claim 14, where the louvered vents extend in an axial direction.

16. An exhaust system for an engine, comprising:
   a 3-way catalyst;
   an exhaust manifold having a plurality of runners merging at a confluence section positioned directly upstream of the 3-way catalyst; and
   a mixer plate extending across the confluence section, the mixer plate including a central opening and louvered vents positioned axially around the central opening, the louvered vents having angled openings facing a common rotational direction.

17. The exhaust system of claim 16, where the mixer plate and an exhaust manifold housing comprise different materials.

18. The exhaust system of claim 16, where the louvered vents are curved in an axial direction.

19. The exhaust system of claim 16, where the mixer plate is axially aligned with a central axis of the 3-way catalyst.

* * * * *